United States Patent

Hsiao et al.

[11] Patent Number: 6,027,660
[45] Date of Patent: Feb. 22, 2000

[54] METHOD OF ETCHING CERAMICS OF ALUMINA/TIC WITH HIGH DENSITY PLASMA

[75] Inventors: Richard Hsiao; Cherngye Hwang, both of San Jose; Son Van Nguyen, Los Gatos; Diana Perez, San Jose, all of Calif.

[73] Assignee: International Business Machines Corproation, Armonk, N.Y.

[21] Appl. No.: 09/075,625

[22] Filed: May 11, 1998

Related U.S. Application Data

[63] Continuation-in-part of application No. 08/880,932, Jun. 23, 1997, abandoned.

[51] Int. Cl.[7] .................................................. B44C 1/22
[52] U.S. Cl. .............................. 216/22; 216/71; 216/76; 216/81
[58] Field of Search ................................ 216/22, 76, 81, 216/71

[56] References Cited

U.S. PATENT DOCUMENTS

| | | | |
|---|---|---|---|
| 4,549,238 | 10/1985 | Ertingshausen et al. | 360/103 |
| 4,601,782 | 7/1986 | Bianchi et al. | 216/72 |
| 5,520,716 | 5/1996 | Takagi et al. | 75/235 |
| 5,567,333 | 10/1996 | Hira et al. | 216/22 |

OTHER PUBLICATIONS

Bayer, T. et al., "Smoothing the Surface of Multi—Phase Materials", IBM TDB, 31(11) (Apr. 1989).
Hinkel, H. et al., "Method of Etching a Composite Material Consisting Electrically Conductive and Dielectric Particles", IBM TDB, 27(6) (Nov. 1984).
"Process to Reactively Etch A1203 for Thin Film Head Fabrication", Research Disclosure No. 320 (Dec. 1990).

*Primary Examiner*—Benjamin Utech
*Assistant Examiner*—George Goudreau
*Attorney, Agent, or Firm*—Merchant & Gould P.C.

[57] ABSTRACT

A method of patterning a ceramic slider by plasma etching is disclosed. The ceramic slider contains alumina and titanium carbide. The method includes the steps of forming an etch pattern by depositing and developing a photoresist on the ceramic slider, and reactive ion etching a first surface on the ceramic slider using an etchant gas. The etchant gas generally includes argon, and a fluorine containing gas. The power source density, during etching ranges from about 0.5 W/(cm$^2$) to 8 W/(cm$^2$). Another aspect of the invention is a ceramic slider resulting from the method of the invention having a smoothness ranging from about 20 to 300 Å as measured by atomic force microscopy.

22 Claims, 8 Drawing Sheets

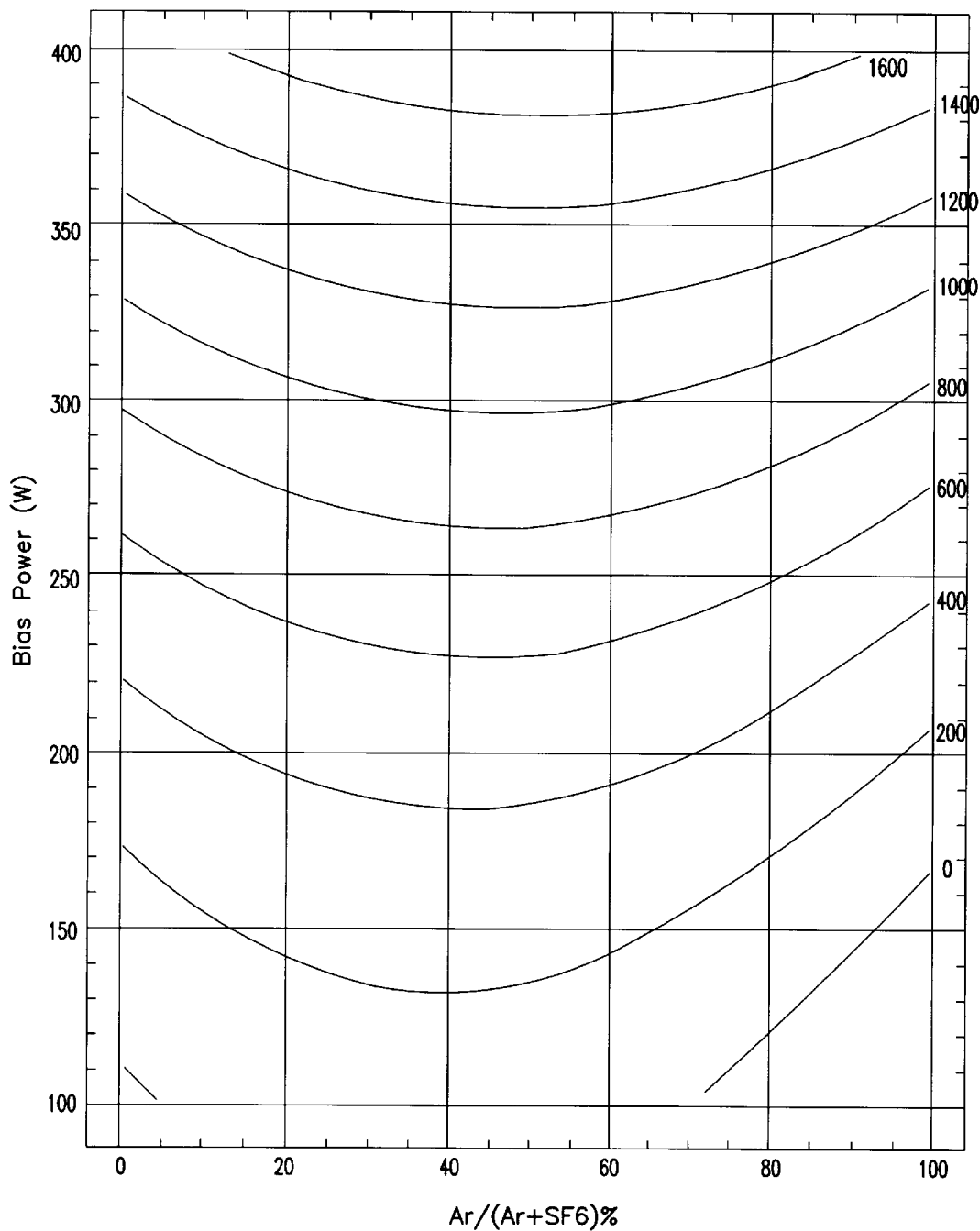
FIG. 3B    Al2O3 etch rate in Ar/SF6 (Å/min)

METHOD OF ETCHING CERAMICS OF ALUMINA/TIC WITH HIGH DENSITY PLASMA

CROSS-REFERENCES TO RELATED APPLICATIONS

This patent application is a continuation-in-part application of Ser. No. 08/880,932 filed Jun. 23, 1997, abandoned, entitled: METHOD OF ETCHING CERAMICS OF ALUMINA/TiC WITH HIGH DENSITY PLASMA, this application incorporated by reference herein.

FIELD OF THE INVENTION

The invention relates generally to methods for etching ceramic materials. More specifically, the invention is a method for Reactive Ion Etching (RIE) ceramic substrates of binary, or greater, composition such as alumina/titanium carbide, using high density plasma etchers. The method provides a matched etch rate for the various constituents within the ceramic substrate.

BACKGROUND OF THE INVENTION

Conventional magnetic disk drives are information storage devices which utilize at least one rotatable magnetic media disk with concentric data tracks, a read/write transducer for reading and writing data on the various tracks, an air bearing slider for holding the transducer adjacent to the track generally in a flying mode above the media, a suspension for resiliently holding the slider and the transducer over the data tracks, and a positioning actuator connected to the suspension for moving the transducer across the media to the desired data track and maintaining the transducer over the data track during a read or a write operation.

The recording density of a magnetic disk drive is limited by the distance between the transducer and the magnetic media. One goal of air bearing slider design is to "fly" a slider as closely as possible to a magnetic medium while avoiding physical impact with the medium. Smaller spacings, or "fly heights", are desired so that the transducer can distinguish between the magnetic fields emanating from closely spaced regions on the disk.

In addition to achieving a small average spacing between the disk and the transducer, it is also critical that a slider fly at a relatively constant height. The large variety of conditions the transducers experience during the normal operation of a disk drive can make constancy of fly height anything but a given. If the flying height is not constant, the data transfer between the transducer and the recording medium may be adversely affected.

The manner in which a slider is manufactured and the material the slider is fabricated from can affect fly height. Preferably variations in the physical characteristics of the slider, e.g. due to manufacturing tolerances, should not substantially alter the flying height of the slider. If this result is not achieved, the slider's nominal fly height must be increased to compensate for variations between sliders.

In forming the slider, processes known to those skilled in the art are generally used. For example, the slider may be coated with a photoresist which is developed to allow for patterning of the slider. The slider may then be patterned by means such as ion beam etching or chemical plasma etching. For example, Japanese Patent No. 07-078804 discloses an ion beam etching process used to provide a thin film magnetic head. The mixing ratio of mixed gas is set so that an organic coating film and an inorganic insulating film are etched at the same rate. Japanese Patent No. 9145325 discloses a reactive ion etching process which comprises introducing $CHF_3$ and Ar gases at a flow ratio of 1:5 or more. The pressure inside the vacuum chamber is maintained at 0.3 Pa or lower to generate plasma for reactive ion etching (RIE).

Japanese Patent No. 08-170181 discloses a dry etching process for tungsten intended to enhance the uniformity of etching rate in the surface of a wafer by using a gaseous mixture of sulfur hexafluoride with Ar when tungsten is dry-etched. Japanese Patent No. 4-129217 discloses a sputter etching process using argon gas that enables cleaning while redeposits in a through hole are removed.

All of Chen, et al, U.S. Pat. No. 5,461,010, Ertingshausen, U.S. Pat. No. 4,549,238, Hira, U.S. Pat. No. 5,567,333, Takagi, U.S. Pat. No. 5,529,716, Terkado, U.S. Pat. No. 5,183,531, Nagano, et al, U.S. Pat. No. 5,234,537, and Blalock, U.S. Pat. No. 5,286,344 also disclose etching processes which may be used for various substrates. For example, Ertingshausen et al, U.S. Pat. No. 4,549,238 discloses a process for reactive ion etching a magnetic head slider. However, Ertingshausen et al does not contemplate the etching of ceramics with a matched rate and at a high rate.

These publications reflect a broad base of teaching concerning the use of etching in the formation of various substrates. However, these etchings do not contemplate the problems of matched constituent etching rates at a high rate providing the necessary smoothness and definition among other concerns of ceramics of binary (or greater) composition.

As a result, there is a need for methods which will provide matched reactive ion etching of the constituents of ceramic substrates with reliable smoothness, high rate and precise definition.

SUMMARY OF THE INVENTION

In accordance with a first aspect of the invention, there is provided a method for plasma etching a ceramic material comprising alumina and titanium carbide. The method comprises the step of reactive ion etching the ceramic material using an etchant gas comprising argon, and a fluorine containing gas. During etching the source power density ranges from about 0.5 W/(cm$^2$) to 10 W/ (cm$^2$).

In accordance with a more preferred aspect of the invention, there is provided a method of patterning a ceramic slider by plasma etching. The ceramic slider comprises alumina and titanium carbide. The method comprises the steps of forming an etch pattern by depositing and developing a photoresist on the ceramic slider, and reactive ion etching a first surface on the ceramic slider using an etchant gas. The etchant gas comprises argon, and a fluorine containing gas. The power source density ranges from about 0.5 W/(cm$^2$) to 8 W/(cm$^2$) during etching.

In accordance with a further aspect of the invention, there is provided a ceramic substrate resulting from the method of the invention wherein the ceramic substrate has a smoothness ranging from about 20 to 300 Å as measured by atomic force microscopy.

In accordance with a further preferred aspect of the invention, there is provided a ceramic slider resulting from the method of the invention, wherein said ceramic slider has a smoothness ranging from about 20 to 300 Å as measured by atomic force microscopy.

BRIEF DESCRIPTION OF THE DRAWINGS

Referring now to the drawings in which like reference numbers represent corresponding parts throughout:

FIG. 3B is a graphical depiction of alumina etch rate as a function of etchant gas mixture and bias power at constant pressure, and constant source power density.

DETAILED DESCRIPTION OF THE PREFERRED EMBODIMENTS

One aspect of the invention is a method of patterning the air bearing surface of a ceramic slider. An exemplary ceramic slider comprises alumina and titanium carbide. Generally the method comprises the steps of forming an etch pattern by depositing and developing a photoresist on the ceramic slider. Reactive ion etching may then be used to pattern the air bearing slider surface using an etchant gas of argon, and one or more fluorine containing gases.

Generally the method of the invention may be used to etch any alumina/titanium carbide substrate. One exemplary substrate is a slider used in the hard drive assembly (HDA) in computing systems common in the industry.

Figure 1:
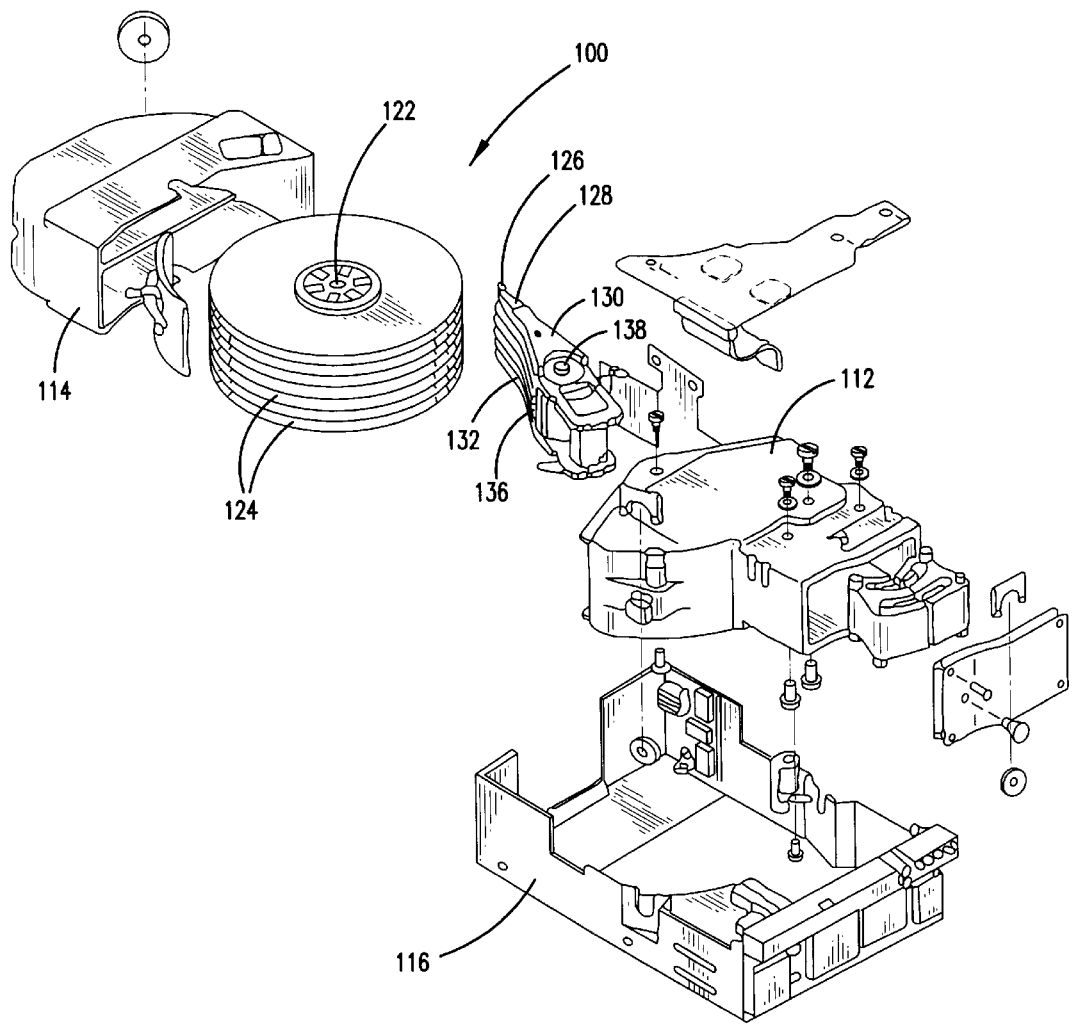
FIG. 1 is an exploded perspective view of an exemplary prior art hard drive assembly including a slider.

An exemplary HDA may be seen in FIG. 1 which is an exploded view of a disk drive 100. The disk drive 100 includes a housing 112 and a housing cover 114 which, after assembly, is mounted within a frame 116. Mounted within the housing is a spindle shaft 122. Rotatably attached to the spindle shaft 122 are a number of disks 124. In FIG. 1, eight disks 124 are attached to the spindle shaft 122 in spaced apart relation. The disks 124 rotate on spindle shaft 122 which is powered by a motor (not shown).

Information is written on or read from the disks 124 by heads or magnetic transducers (not shown) which are supported by sliders 126. Preferably, sliders in accordance with the invention are coupled to suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

Figure 2A:
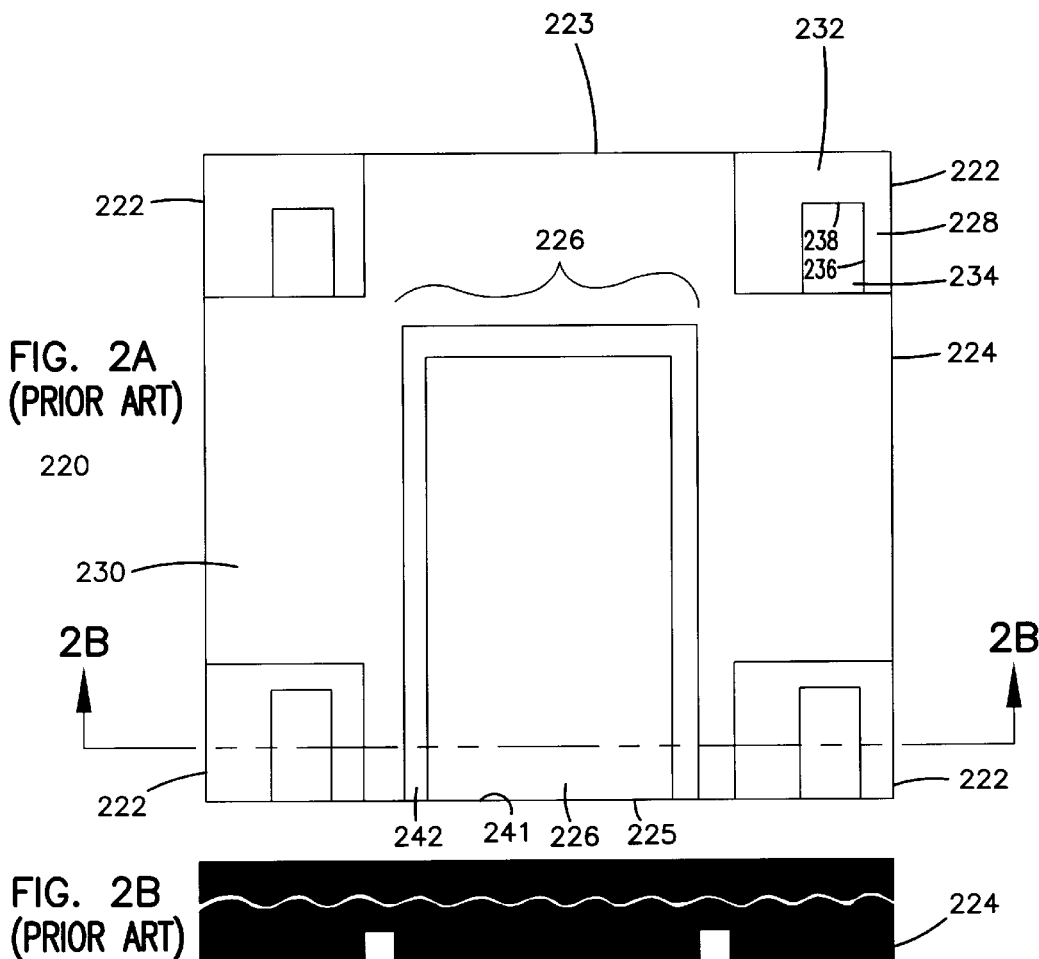
FIG. 2A is a bottom plan view of an exemplary prior art slider.
Figure 2B:
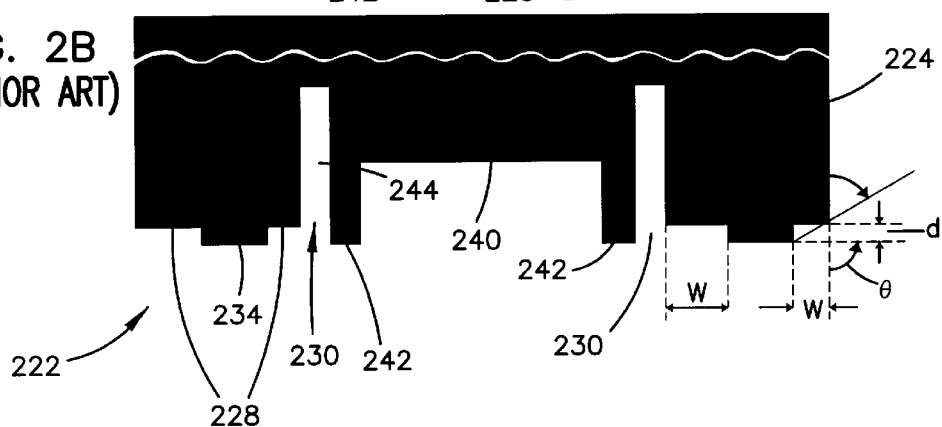
FIG. 2B is a partial cutaway view along axis B—B of the prior art slider depicted in FIG. 2A.

To facilitate the read/write operations of the hard drive assembly, slider design can be intricate, to ensure correct and constant fly height in varying conditions. To fulfill the intended purpose of the slider, it is often patterned with various reliefs and protrusions to enhance aerodynamic character. For example, FIGS. 2A–2B illustrate a slider design 200 as disclosed in U.S. Pat. No. 5,404,256, issued Apr. 4, 1995 to James W. White, entitled "TRANSVERSE AND NEGATIVE PRESSURE CONTOUR GAS BEARING SLIDER", and which is incorporated by reference herein. The slider illustrated in FIGS. 2A–2B is designed to provide uniform and controllable fly height through a range of skew angles.

In FIGS. 2A–2B, traverse pressure contour (TPC) pads 222 are defined by a face 234 for creating a gas bearing effect, a generally U-shaped TPC section 228 including a constant depth step bearing along each side edge 236 of the face 234 and a constant depth step along the leading edge 238 forming a converging compression inlet 232. Thus, the gas bearing contour of the TPC pad 222 is defined by two parallel planes created by two different etch steps.

A negative pressure pad 226 is defined by a substantially planar surface which contains a recess 240 open at the trailing end 225. The negative pressure pad 226 may further include one or more bearing faces 242 at a height approximately that of the faces 234 of the TPC pads 222 for creating a gas bearing effect. Recess 240 is open along the trailing edge 241; that is, trailing edge 241 is substantially ambient. The ambient pressure reservoir 230 defines a cavity 244 having a depth and configuration sufficient to maintain substantial ambient pressure in the cavity during movement of the disk. Further, ambient pressure reservoir 230 includes a non-tapered (non-stepped, non-convex) inlet along leading edge 223 so as to inhibit generation of gas bearing effects created by compression of inlet gas.

The design as illustrated in FIGS. 2A–2B requires three etch depths to achieve the desired performance. As a result, given the nature of the material, there is a real need for an etching process which can define the intricate detail on the slider face to enhance the aerodynamic character of this HDA element.

Processing

In accordance with the invention, the ceramic substrate may be masked by means known to those of skill in the art such as commercially available photolithography processes. Reactive ion etching is then used to etch a substrate comprising alumina and titanium carbide. High density plasma etchers known to those of skill in the art may be used such as inductively coupled plasma etchers or electron-cyclotron-resonance plasma etchers. Generally the substrates which may be etched with the method of the invention comprises from about 60 wt-% to 70 wt-% alumina and 30 wt-% to 40 wt-% titanium carbide.

In this invention, high density plasma tools, such as inductively coupled plasma (ICP) or electron cyclotron resonance (ECR) etchers are utilized to achieve high and matched rates of TiC and $Al_2O_3$. By using these etchers, plasma density (ion current density and reactive neutral density) and the ion bombardment energy are controlled independently to achieved the stated etching results.

In these etchers, a higher plasma density is achieved by using a more efficient plasma excitation technique. The plasma density is adjusted by changing the source power while the ion bombardment energy is controlled by a separate RF source. The excitation frequency of the separate RF source is at 13.56 MHz or below to achieve desired ion bombardment. The features of these etchers make it possible to achieve high and matched TiC and $Al_2O_3$ etch rates.

The invention provides a matched etch rate for TiC and $Al_2O_3$ through control of gas chemistry, source power, and bias power. For gas chemistry, as specified, an inert gas is combined with a reactive flourine containing gas to enhance the etching process. Source power controls plasma density. In turn bias power controls bias voltage. The amount of bias power used to provide a given bias voltage may vary given reactor geometry. Thus while bias power is an important factor in obtaining a matched etch rate, bias voltage may be used as an indicator of bombardment energy and to obtain matched etch rate.

Generally, the reactive gas is a fluorine containing gas such as carbon tetrafluoride ($CF_4$), methyl trifluoride ($CHF_3$), tetrafluoroethane ($C_2H_2F_4$), sulfur hexafluoride ($SF_6$), and mixtures thereof, among others. The inert carrier gas may generally comprise argon, xenon, or helium, among other constituents.

While the inventors do not wish to be bound by a theory of activity, the etching reaction is believed to proceed according to the following mechanism.

For TiC etching, the fluorine-containing species in the plasma first absorb on the sample surface to react with TiC to form volatile $TiF_4$ which will be removed by the sputtering component of the RIE process. The sputtering is achieved by the positive ions in the plasma that are accelerated by the bias voltage developed on the cathode on which the sample is placed. Argon gas, for example, is a good source of positive ions and the argon ions are efficient sputtering species.

For $Al_2O_3$ etching, the fluorine-containing species in the plasma also first absorb on the surface. Fluorine and $Al_2O_3$ will then react to form AlFx or AlFxOy. Since the aluminum fluoride formed does not adhere well to the underlying $Al_2O_3$, it can be sputtered away more easily. Thus the etching rate is enhanced.

Presented below are four experimental runs which are intended to illustrate variance in etch rate given variance in other physical parameters. In each case etch rate is indicated in Å/min by the number on the right side of each respective curve in the graph.

Figure 3A:
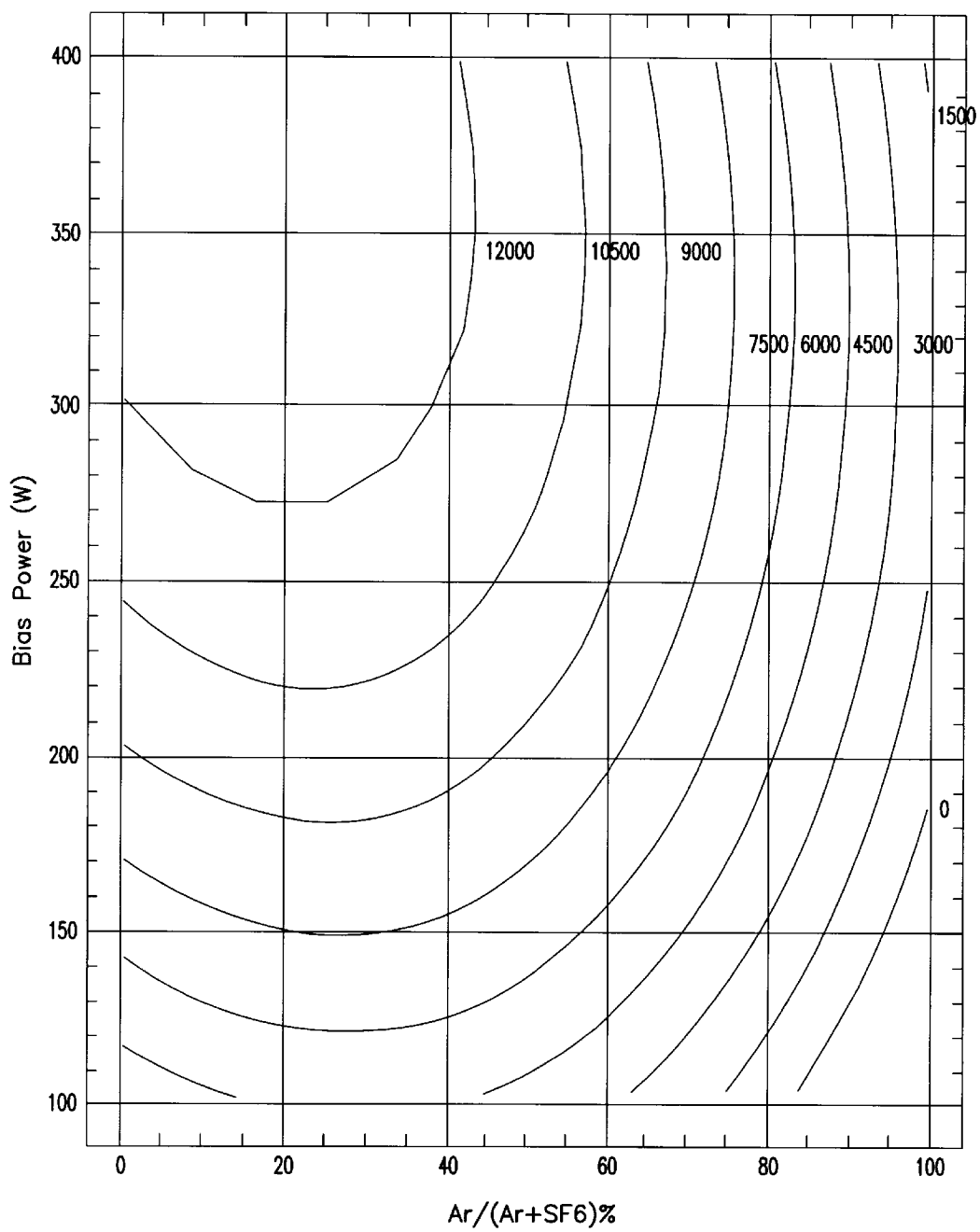
FIG. 3A is a graphical depiction of TiC etch rate as a function of etchant gas mixture and bias power at constant pressure, and constant source power density.

FIG. 3A shows the TiC etch rates (ranging from a baseline of 0 Å/min to approximately 12000 Å/min) as a function of Ar% in $Ar/SF_6$ mixture, bias power at 5 mtorr processing pressure, and source power density at 5 W/cm². The etch rate is enhanced with more $SF_6$ in the gas mixture. The dependence of etch rate on bias power (a measurement of ion bombardment energy) is much weaker compared to the dependence on the gas composition. Because the reaction product is volatile, the reaction product formation, (which depends on the availability of the active fluorine containing species), rather than the removal rate of the reaction product is the rate limiting factor.

FIG. 3B shows the $Al_2O_3$ etch rates (ranging from a baseline of 0 Å/min to approximately 1600 Å/min) as a function of Ar% in $Ar/SF_6$ mixture and bias power. The source power density was 5 W/cm². In this case, the etch rate depends on bias power more strongly than on gas composition. Apparently, removing reaction product when etching $Al_2O_3$ is the rate limiting step and an increase of bias power improves the removal rate significantly.

Figure 4A:
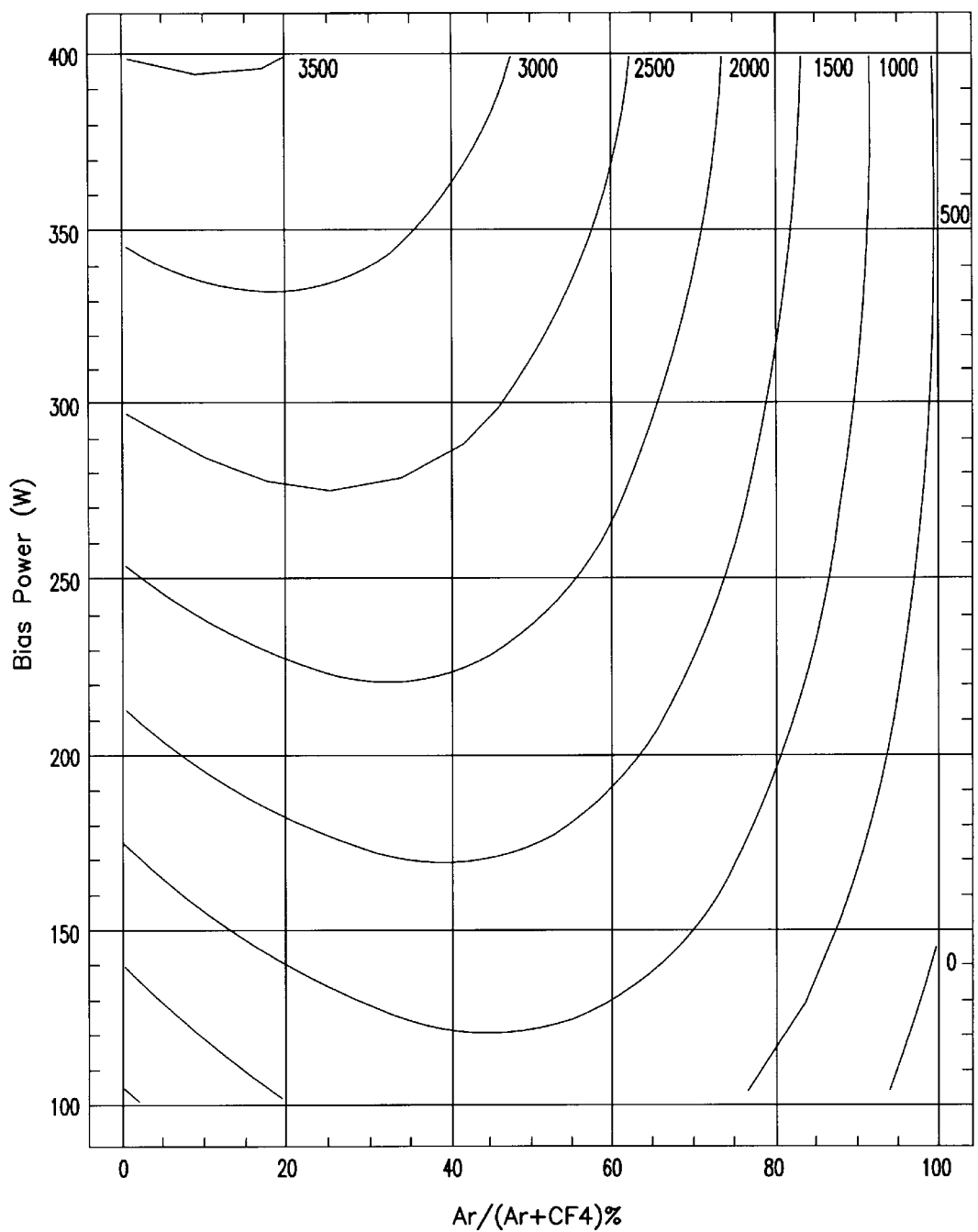
FIG. 4A is a graphical depiction of TiC etch rate as function of etchant gas mixture and bias power, at constant source power density.
Figure 4B:
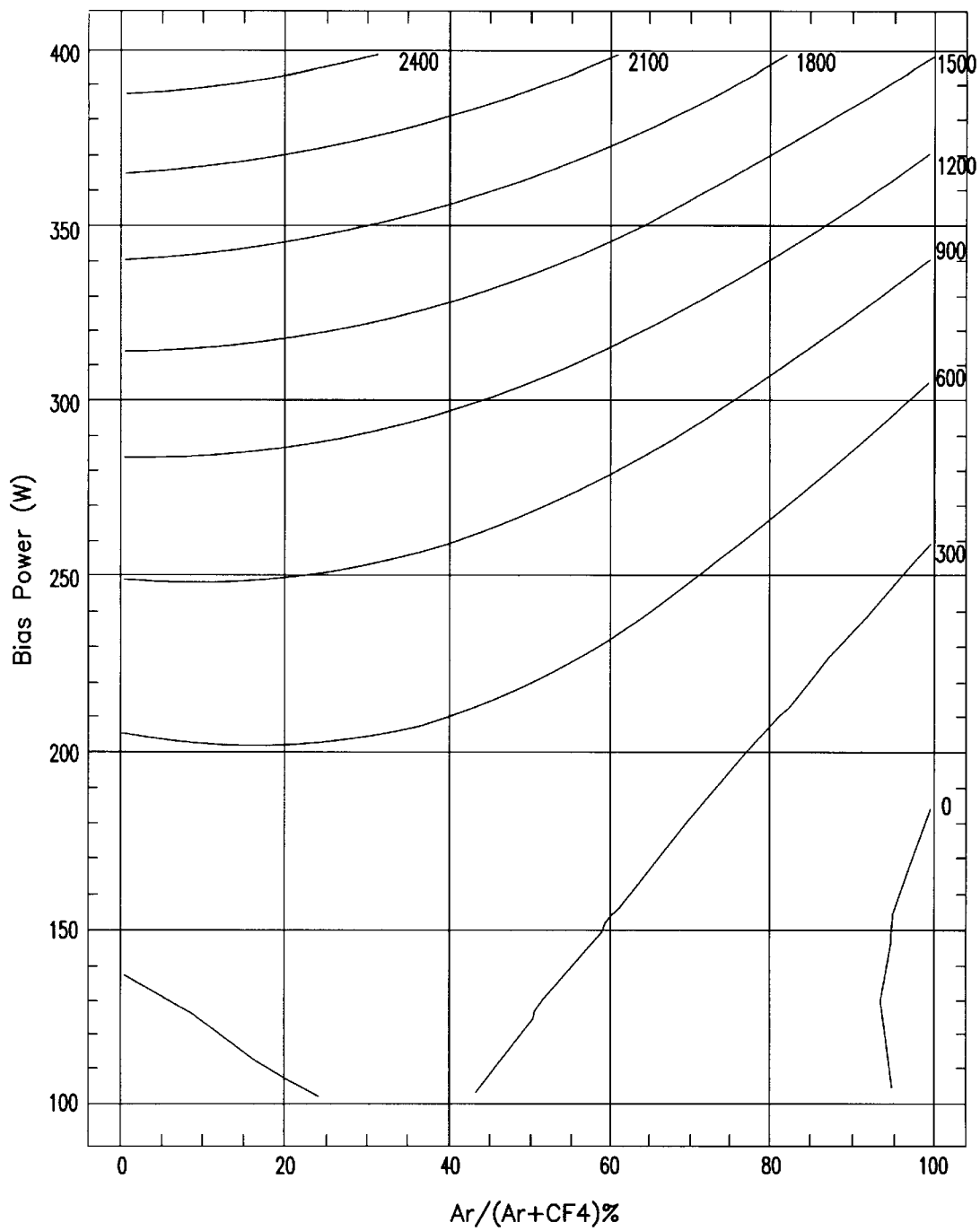
FIG. 4B is a graphical depiction of alumina etch rate as a function of etchant gas mixture and bias power, at constant source power density.

FIGS. 4A and 4B show the TiC and $Al_2O_3$ etch rate (ranging from a baseline of 0 Å/min to approximately 3500 Å/min. for TiC, and ranging from a baseline of 0 Å/min to approximately 2400 Å/min for $Al_2O_3$), respectively, as a function of Ark in $Ar/CF_4$ mixture and bias power. The source power density for each run was 5 W/cm². Again the TiC rate increases more significantly with $CF_4$% and less significantly with bias power. The $Al_2O_3$ etch rate increases more significantly with the bias power and less significantly with $CF_4$%. Compared to the case of $Ar/SF_6$ mixture, $Ar/CF_4$ mixture offers a higher $Al_2O_3$ etch rate and a lower TiC etch rate so it is easier to match the two rates.

Figure 4C:
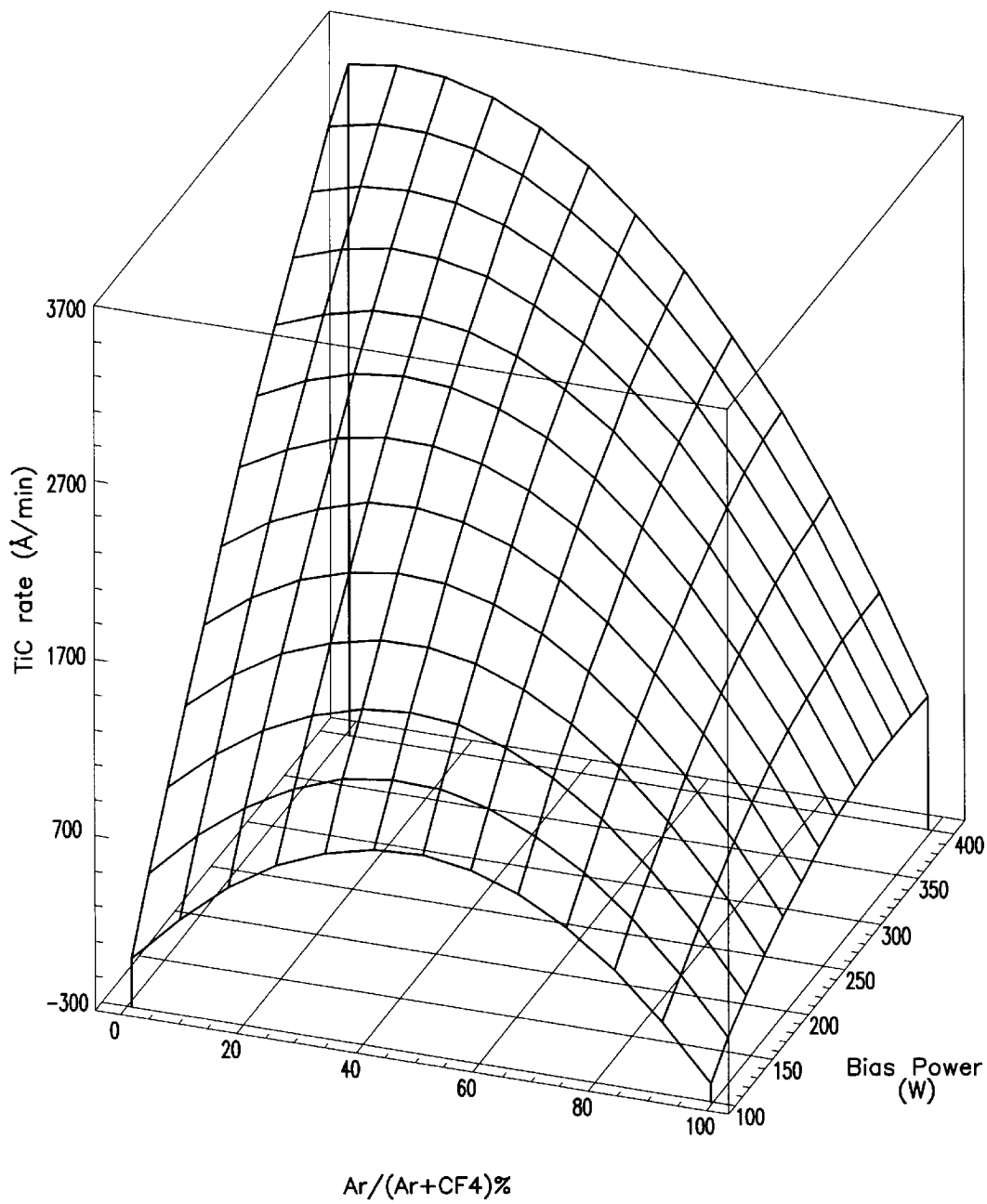
FIGS. 4C and 4D are three dimensional presentations of the graphical depictions of FIGS. 4A and 4B, respectively.
Figure 4D:
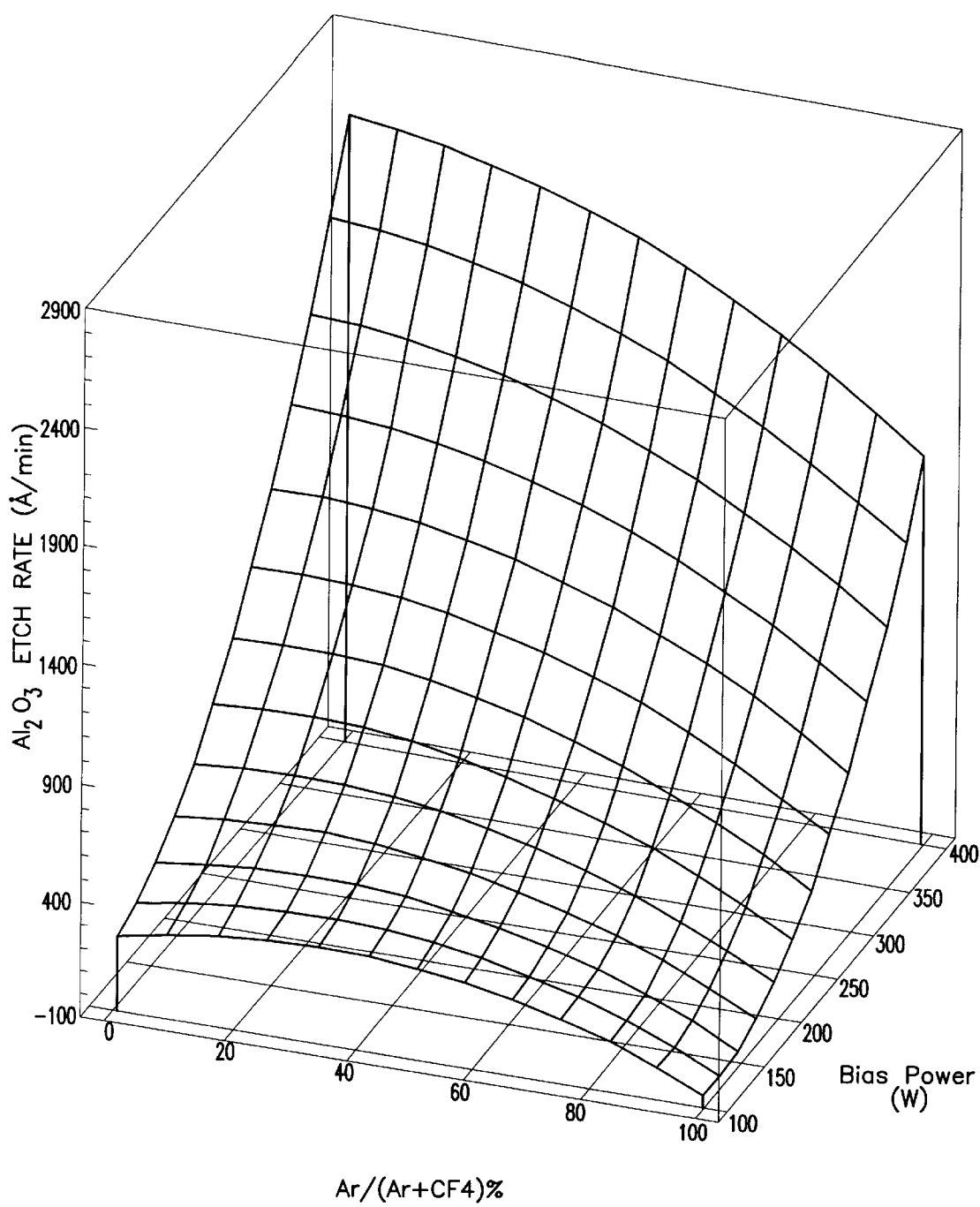

FIGS. 4C and 4D are the three dimensional presentations of FIGS. 4A and 4B. From these two figures, one can learn how to increase and match the TiC and $Al_2O_3$ etch rates. For most conditions covered by those figures, the $Al_2O_3$ etch rate is lower than that of TiC. In order to match the rate of the two, one can increase the bias power at a certain Art at which the $Al_2O_3$ rate is lower than that of TiC at a lower bias power. Since the $Al_2O_3$ rate increases with bias power is faster than that of TiC, a rate match can be achieved at a high bias level.

For example, about 2500 Å/min. etch rate is achieved for both $Al_2O_3$ and TiC at 550 W (corresponding to about 400 V ion acceleration voltage) bias power, 85% Ar, 600 W source power (about 5 W/cm²), and 6 mtorr processing pressure.

The Tables provided below provide exemplary processing guidelines for the method of the invention.

| Gases | | | |
|---|---|---|---|
| GAS FLOWRATE | USEFUL | PREFERRED | MORE PREFERRED |
| Argon (Vol-%) | 30–90 | 40–85 | 40–85 |
| Fluorine Gas (Vol-%) | 10–70 | 15–60 | 15–60 |

| Reaction Parameters | | | |
|---|---|---|---|
| PARAMETER | USEFUL | PREFERRED | MORE PREFERRED |
| Temperature (° C.) | 40–100 | 50–80 | 40–60 |
| Bias Voltage (V) | −300 to −1500 | −400 to −1200 | −450 to −900 |
| Frequency (MHz) | 0.2–40 | 0.2–13.56 | 13.56 |
| Pressure (MTorr) | 1–10 | 2–8 | 2–5 |
| Source Power Density (W/cm²) | 0.5–10 | 0.5–8 | 1–6 |

Generally, the etch rate obtained in accordance with the invention is higher than with conventional processes. For example, the etch rate of the $TiC/Al_2O_3$ ceramic may be as high as about 1200 Å/min and range from about 800 to 3500 Å/min. Preferably the etch rate of the $TiC/Al_2O_3$ ceramic is about 1000 Å/min to 3000 Å/min, and more preferably about 1200 to 2500 Å/min.

The matching of the etch rate for TiC and alumina may be effectively monitored by, and correlated to, surface roughness. The smoother the substrate surface after etching, indicates that the etch rate for the two species is closer than not. The roughness of the substrate once etched ranges from 20 to 300 Å, and preferably less than about 250 Å as measured by atomic force microscopy.

EXAMPLES

The following working and comparative examples provide a typical nonlimiting illustration of some of the advantages of the invention.

Example 1

In accordance with the present invention, an inductively coupled plasma etcher was used to achieve the high and matched rates of $Al_2O_3$ and TiC etching. In this process, the bias power was 600 W (about 5 W/cm$^2$), gas composition was 85% Ar and 15% $CF_4$, and processing pressure was 5 mtorr. A rate of 2500 Å/min was achieved for both $Al_2O_3$ and TiC.

Example 2

In accordance with the present invention, an electron-cyclotron-resonance etcher was used for this application. In this process, the bias power was 2000 W, (corresponding to an ion acceleration energy of about 770 v), microwave power was 500 W (about 1.3 W/cm$^2$), gas composition was 40% Ar, 40% $SF_6$, and 20% $CHF_3$. and processing pressure was 2 mtorr. A rate of 1231 Å/min was achieved and for an etching depth of 20,000 Å, the roughness was 139 Å as measured by atomic force microscopy.

The above specification, examples and data provide a complete description of the manufacture and use of the methods and composition of the invention. Since many embodiments of the invention can be made without departing from the spirit and scope of the invention, the invention resides in the claims hereinafter appended.

What is claimed is:

1. A method for plasma etching a ceramic material said ceramic material comprising alumina and titanium carbide, said method comprising the step of reactive ion etching said ceramic material using an etchant gas comprising argon, and a fluorine containing gas, said source power density ranging from about 0.5 W/(cm2) to 10 W/(cm2) wherein the etch rate of alumina and the etch rate of titanium carbide are matched resulting in a roughness ranging, from about 20 to 300 Å in said ceramic material.

2. The method of claim 1, wherein said alumina is etched at a rate of from about 800 Å/min. to 3500 Å/min.

3. The method of claim 1, wherein said source power density ranges from about 0.5 W/(cm$^2$) to 8 W/(cm$^2$).

4. The method of claim 1, wherein said ceramic material is etched at a frequency of about 13.56 MHz or less.

5. The method of claim 1, wherein during etching said ceramic material is biased at a voltage ranging from about −300 v to −1500 v.

6. The method of claim 1, wherein said ceramic material is etched at a current density of greater than about 1 mA/(cm$^2$).

7. The method of claim 1, wherein etching is undertaken at a pressure of about 1 to 10 mtorr.

8. The method of claim 1, wherein said ceramic is etched at a rate of about 1000 to 3000 Å/min.

9. The method of claim 1, wherein said etchant gas comprises argon and a fluorine containing gas selected from the group consisting of carbon tetrafluoride, sulfur hexafluoride, methyl trifluoride and mixtures thereof.

10. The method of claim 9, wherein the concentration of the fluorine gas in the etchant gas ranges in concentration from about 10 vol-% to 70 vol-%.

11. The method of claim 1, wherein said reactive ion etching is conducted at a temperature ranging from about 40 to 100° C.

12. A method of patterning a ceramic slider by plasma etching, said ceramic slider comprising alumina and titanium carbide, said method comprising the steps of:

(a) forming an etch pattern by depositing and developing a photoresist on said ceramic slider;

(b) reactive ion etching a first surface on said ceramic slider using an etchant gas, said etchant gas comprising argon, and a fluorine containing gas, said source power density ranging from about 0.5 W/(cm$^2$) to 8 W/(cm$^2$) wherein the etch rate of alumina and the etch rate of titanium carbide are matched resulting in a roughness from about 20 to 300 Å in said ceramic material.

13. The method of claim 12, wherein said ceramic slider first surface is etched at a rate of from about 800 Å/min. to 3500 Å/min.

14. The method of claim 12, wherein said source power density ranges from about 1 W/(cm$^2$) to 6 W/(cm$^2$).

15. The method of claim 12, wherein said ceramic slider first surface is etched at a frequency of about 13.56 MHz or less.

16. The method of claim 12, wherein during etching said ceramic slider is biased at a voltage ranging from about −400 v to −1000 v.

17. The method of claim 12, wherein said ceramic slider first surface is etched at a current density of greater than about 1 mA/(cm$^2$).

18. The method of claim 12, wherein etching is undertaken at a pressure of about 2 to 8 mtorr.

19. The method of claim 12, wherein said ceramic slider first surface is etched at a rate of about 1000 to 3000 Å/min.

20. The method of claim 12, wherein said etchant gas comprises argon and a fluorine containing gas selected from the group consisting of carbon tetrafluoride, sulfur hexafluoride, methyl trifluoride and mixtures thereof.

21. The method of claim 20, wherein the concentration of the fluorine gas in the etchant gas ranges in concentration from about 15 vol-% to 60 vol-%.

22. The method of claim 12, wherein said reactive ion etching is conducted at a temperature ranging from about 50 to 80° C.

* * * * *